C. F. WAITE.
TOOL HOLDER FOR LATHES.
APPLICATION FILED FEB. 7, 1914.

1,158,753.

Patented Nov. 2, 1915.
2 SHEETS—SHEET 1.

WITNESSES:
Charles N Wood
J. Murphy

INVENTOR.
Charles F. Waite
BY Jas. H. Churchill
ATTORNEY.

C. F. WAITE.
TOOL HOLDER FOR LATHES.
APPLICATION FILED FEB. 7, 1914.
1,158,753.
Patented Nov. 2, 1915.
2 SHEETS—SHEET 2.
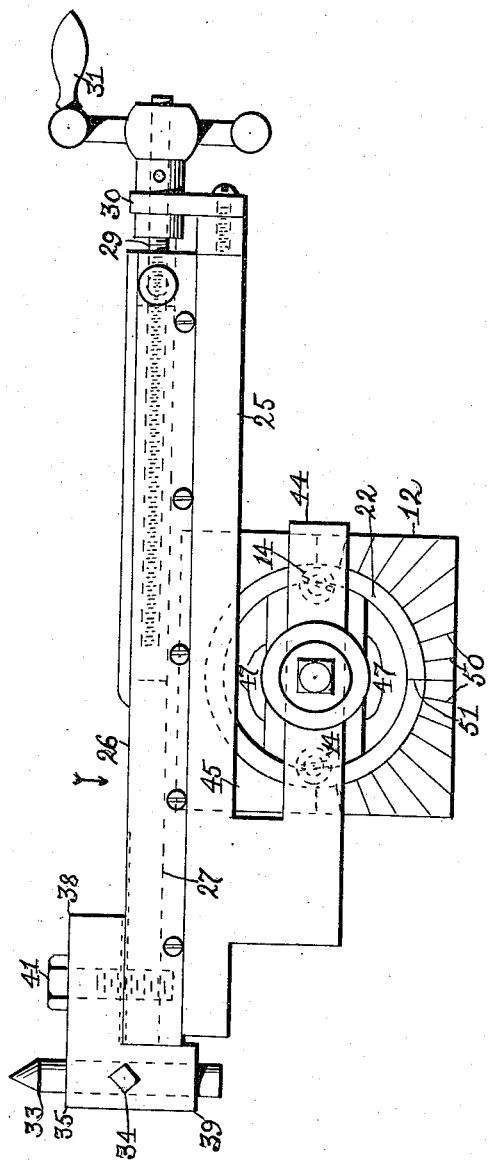
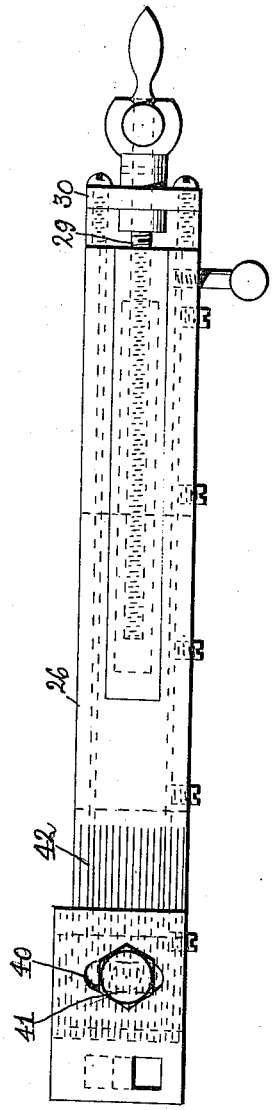
WITNESSES:
INVENTOR.
Charles F. Waite
BY
Jas. H. Churchill
ATTORNEY.

UNITED STATES PATENT OFFICE.

CHARLES F. WAITE, OF CAMBRIDGE, MASSACHUSETTS.

TOOL-HOLDER FOR LATHES.

1,158,753.    Specification of Letters Patent.    Patented Nov. 2, 1915.

Application filed February 7, 1914. Serial No. 817,330.

*To all whom it may concern:*

Be it known that I, CHARLES F. WAITE, a citizen of the United States, and a resident of Cambridge, in the county of Middlesex and State of Massachusetts, have invented an Improvement in Tool-Holders for Lathes, of which the following description, in connection with the accompanying drawings, is a specification, like characters on the drawings representing like parts.

This invention relates to a novel tool holder for use on lathes of ordinary construction, and has for its object to provide a simple and efficient tool holder, which can be applied to an ordinary lathe and enable the work to be cut, ground, bored or otherwise treated on any angle desired or required, thereby enabling a class of work to be performed on a lathe of ordinary construction, which can not now be performed on such lathe. To this end, the improved tool holder has provision for engagement with the tool post on the carriage of the ordinary lathe, and also has provision for enabling it to be turned or swiveled in an arc or circle concentric with the said tool post, so as to present the tool to the work at any angle desired or required, and when properly positioned to be fed longitudinally of the work, as will be described. Provision may and preferably will be made for obtaining adjustment of the tool in a plane perpendicular to the plane in which the tool holder is rotatable.

These and other features of this invention will be pointed out in the claims at the end of this specification.

Figure 1:
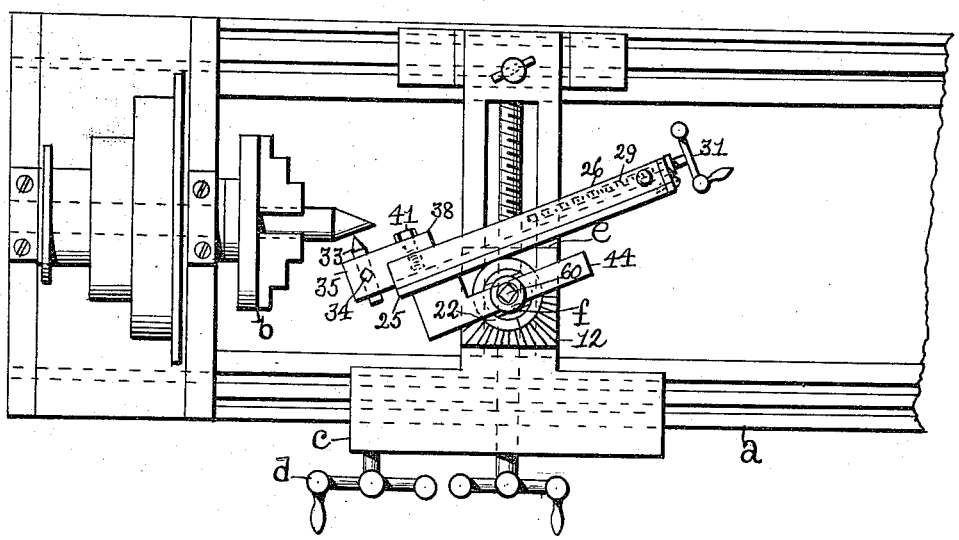
Figure 2:
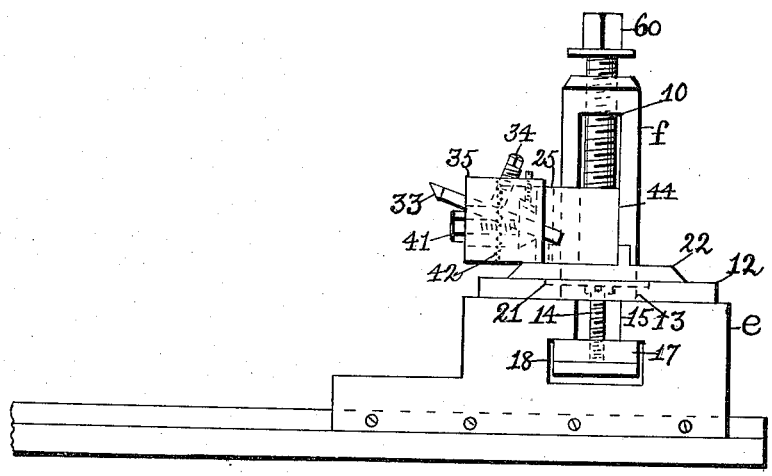

Figure 1 is a plan of a portion of a lathe provided with a tool holder embodying this invention. Fig. 2, an end elevation of the tool holder and a portion of the carriage. Fig. 3, a plan of the tool holder on a larger scale, and Fig. 4, a face view of the tool holder looking in the direction of the arrow in Fig. 3.

Referring to the drawing *a* represents a lathe of ordinary construction, such as now commonly found in machine shops, and which is provided with the usual work holder or chuck *b*, the main tool carriage *c* movable longitudinally toward and from the work holder *b* by turning the handle *d*, and the auxiliary carriage *e* which supports the tool post *f* and which is movable on the main carriage transversely of the lathe. The tool post *f* is provided with a slot 10, through which the ordinary tool (not shown) is inserted and secured in fixed relation to said post.

The present invention has for its object to provide a lathe of the character described, and which may be termed an ordinary lathe, with a tool holder which is capable of being applied to the tool post *f*, and which has provision for enabling the tool holder to be rotated or turned in an arc concentric with the post *f*. The carriage *e* has secured to it a base plate 12, which is square in shape and provided with a central opening 13 of substantially the diameter of the tool post *f*, over which the base plate 12 is slipped and secured in fixed relation to the carriage *e*, by screws 14 which extend down through the vertical slot 15 in the carriage *e* and engage clips or holding bars 17, which are located in the horizontal slot 18 in the carriage *e* and engage the upper wall thereof. The base plate 12 is provided with countersinks for the heads of the screws 14.

The base plate 12 is provided on its upper surface with a circular recess for the reception of a circular flange 21 on the under surface of a circular disk 22, which is capable of being rotated or turned on the base plate 12 and which is provided with a central opening for the passage of the tool post *f*. The disk 22 constitutes a rotatable support for the tool holder, which is preferably constructed as herein shown, and which comprises two members 25, 26 in sliding engagement with each other and which may be designated the stationary and movable members of the tool holder. The stationary member 25 is provided on its front face with a dovetailed rib or key 27, which fits into a dovetailed slot in the back face of the movable member 26, and the latter is provided with a longitudinally extended threaded socket for the reception of a thread rod or screw 29, mounted to turn in plate 30 secured to the end of the stationary member 25, and provided with a handle 31, by turning which the member 26 may be moved longitudinally with relation to member 25.

The tool 33 is herein shown as a cutting tool, but may be of any other form according to the character of the work to be performed, such for instance as a grinding tool, or a boring tool. The tool 33 may be secured directly to the member 26, but it is preferred to secure it, as by the screw 34, to an auxiliary member 35, which is adjustably secured to the member 26, so as to provide for adjustment of the tool with relation to the work in a plane or direction transversely to the member 26, so that the tool may be raised and lowered with relation to the work. In the present instance, the auxiliary member 35 is shown as an angle bar having one arm 38 in contact with the front face of the movable member 26 and its other arm 39 in contact with the end of the movable member 26, and to provide for the vertical adjustment of the auxiliary member 35, the latter is provided with a slot 40 through which is extended a set screw 41. To insure fixed relation between the movable member 26 and the auxiliary member 35 in the adjusted positions of the latter, the movable member 26 is provided on its front face with a plurality of parallel teeth or projections 42, which engage with like teeth on the rear face of the arm 38 of the movable member, and prevent movement of the auxiliary member with relation to the movable member when the screw 41 is set up.

The stationary member 25 of the tool holder is provided with an arm 44, which extends parallel therewith but is separated therefrom by a space 45. The arm 44 is designed to extend through the slot 10 in the tool post $f$ and to rest on the rotatable disk 22, and is positioned on said disk by two sets of substantially parallel lugs 47, between which the arm 44 is located, see Fig. 3, said pairs of lugs being located on the disk 22 on opposite sides of the center opening through which the tool post $f$ projects.

The base plate 12 may be provided on one side of its upper surface with a series of radial lines 50, which form a scale to indicate various angles, and with which a mark 51 on the disk 22 coöperates, to position the tool at the proper or desired angle with relation to the work.

In operation with the tool holder herein shown, the base plate 12 is fitted over the tool post $f$ and is squared with relation to the chuck $b$, after which it is secured in fixed relation to the carriage $e$ by the clips 17 and screws 14. The tool holder is then affixed to the rotatable disk or support 22, by extending its arm 44 through the slot 10 in the tool post and fitting said arm between the lugs 47 on the disk 22, and turning the screw 60 until the arm 44 is firmly clamped between the screw 60 and the disk 22. The tool holder is then rotated or turned, until the tool 33 is presented at the proper or desired angle to the work, which may be made known by the scale 50 on the base plate 12 with which the mark 51 on the disk 22 coöperates. The tool having been properly positioned with relation to the work, can then be fed longitudinally of the work by the operator turning the handle 31, to effect longitudinal movement of the movable member 26 of the tool holder with relation to the stationary member, and thereby cause the tool to travel in the direction of the length of the work in a path which may be parallel with the work or at an angle thereto, and thus enable a class of work to be done on a lathe of ordinary construction, which now requires a specially built lathe to perform.

In the present instance I have shown one construction embodying the invention but it is not desired to limit the invention to the particular construction shown except as defined by the claims.

Claims:

1. In a lathe, in combination, a carriage movable lengthwise of the lathe, a tool post mounted to turn on said carriage, and provided with a slot, a base plate fitted over said tool post and secured in fixed relation to said carriage, a disk fitted over said tool post and mounted on said base plate to turn thereon, a tool holder comprising a stationary member provided with an arm which is extended into the slot in said tool post, and a tool carrying member movable on said stationary member in the direction of the length of said stationary member, means carried by said stationary member for effecting longitudinal movement of said tool carrying member, and means for securing said stationary member in fixed relation to said disk and tool post, substantially as described.

2. In a lathe, in combination, a carriage movable lengthwise of the lathe, a tool post mounted to turn on said carriage, and provided with a slot, a base plate fitted over said tool post and secured in fixed relation to said carriage, a disk fitted over said tool post and mounted on said base plate to turn thereon, and a tool holder having an arm extended into the slot of said tool post and secured to said disk to rotate therewith and provided with a movable tool carrying member, and means for moving said tool carrying member in the direction of its length independently of said carriage.

3. In a lathe, in combination, a carriage movable lengthwise of the lathe, a tool post mounted to turn on said carriage, a base plate secured in fixed relation to said carriage and through which the tool post is extended, a disk fitted over the said tool post, and rotatably mounted on said base plate, and a tool holder having a member supported by said disk to revolve therewith and detachably secured thereto, and having a tool carrying member movable on the first mentioned member in the direction of the length thereof, means carried by the first mentioned member for effecting longitudinal movement of the tool carrying member, and means carried by the tool post for securing the tool holder to the said disk, substantially as described.

4. In a tool holder of the character described, in combination, a stationary member having attached to it a substantially parallel arm for engagement with the slotted tool post of an ordinary lathe, a tool holding member in sliding engagement with the stationary member, and provided with a series of substantially parallel teeth, an auxiliary movable tool holding member provided with a series of substantially parallel teeth to engage the teeth on the main movable tool holding member, means for securing said main and auxiliary movable members in fixed relation, and a feed mechanism for the movable tool holding members carried by said stationary member.

5. In a tool holder of the character described, in combination, a stationary member provided with an arm extended substantially parallel therewith for engagement with the slotted tool post of an ordinary lathe, a main movable tool holding member mounted to slide on said stationary member, an auxiliary tool holding member adjustably secured to said main movable member to move in a plane substantially at right angles to that in which the main movable member is moved on said stationary member, and means carried by said stationary member for effecting longitudinal movement of the tool holding members, substantially as described.

In testimony whereof, I have signed my name to this specification in the presence of two subscribing witnesses.

CHARLES F. WAITE.

Witnesses:
JAS. H. CHURCHILL,
J. MURPHY.

Copies of this patent may be obtained for five cents each, by addressing the "Commissioner of Patents, Washington, D. C."